United States Patent
Geisman et al.

(10) Patent No.: US 6,932,358 B1
(45) Date of Patent: Aug. 23, 2005

(54) QUICK CHANGE ENDFORM TOOL CARTRIDGE

(75) Inventors: Ronald E. Geisman, Horton, MI (US); Steven A. White, Horton, MI (US)

(73) Assignee: Lomar Machine & Tool Co., Horton, MI (US)

( * ) Notice: Subject to any disclaimer, the term of this patent is extended or adjusted under 35 U.S.C. 154(b) by 79 days.

(21) Appl. No.: 10/284,935

(22) Filed: Oct. 31, 2002

(51) Int. Cl.$^7$ ............................................. B23B 31/107
(52) U.S. Cl. ............................ 279/71; 279/81; 72/318
(58) Field of Search .............................. 279/71, 72, 73, 279/81; 408/239 R, 240; 72/318, 370.1, 72/370.03

(56) References Cited

U.S. PATENT DOCUMENTS

| | | | | |
|---|---|---|---|---|
| 1,024,172 A | * | 4/1912 | Bergsten | 279/81 |
| 1,754,637 A | * | 4/1930 | McGough | 72/318 |
| 1,791,887 A | * | 2/1931 | Davies et al. | 72/318 |
| 2,297,885 A | * | 10/1942 | Graf et al. | 72/318 |
| 2,449,277 A | * | 9/1948 | Cherry | 279/81 |
| 2,731,273 A | * | 1/1956 | Edens | 279/81 |
| 3,225,581 A | * | 12/1965 | Gottlob | 72/370.03 |
| 4,188,041 A | * | 2/1980 | Soderberg | 279/75 |
| 4,708,548 A | * | 11/1987 | Taylor et al. | 409/234 |
| 4,767,246 A | * | 8/1988 | Camloh et al. | 409/234 |
| 4,779,441 A | * | 10/1988 | Pringle | 72/316 |
| 4,919,023 A | * | 4/1990 | Bloink | 82/160 |
| 6,233,992 B1 | * | 5/2001 | Geisman | 72/94 |
| 6,457,243 B2 | * | 10/2002 | Kimura | 30/360 |

FOREIGN PATENT DOCUMENTS

CH 381049 * 10/1964

\* cited by examiner

*Primary Examiner*—Daniel W. Howell
(74) *Attorney, Agent, or Firm*—Young & Basile, P.C.

(57) ABSTRACT

A quick change tool cartridge for high production endform machines having a plurality of work stations mounted upon an indexable rotary head. The tool cartridge system is mounted upon the tool support by quick connect radially movable elements or pins radially displaced by a rotatable actuator sleeve. The locking elements cooperate with a groove, or holes, within the tool holder depending on whether or not relative rotation between the tool support and tool holder is desired.

1 Claim, 1 Drawing Sheet

QUICK CHANGE ENDFORM TOOL CARTRIDGE

BACKGROUND OF THE INVENTION

1. Field of the Invention

The invention pertains to quick change tool cartridge systems for multiple station endforming machines wherein work stations are indexed about an axis of rotation.

2. Description of the Related Art

Endforming machines are used to axially upset the elongated workpieces, usually tubes, to form the end of the tube or produce an annular enlargement or diametric reduction in the tube. Endforming tools engage the end of the workpiece while the workpiece is firmly held against axially displacement.

The endforming tools used with endforming machines of the above type are normally semi-permanently mounted upon the tool support by set screws and the like, whereby the tools may be accurately related to their holder, but it is necessary for the operator to stop the machine, rotate the tool holding screws or other elements, and then again start the machine once the new tool is in place. Quick change tool cartridge systems for endforming machines have not previously been available.

OBJECTS OF THE INVENTION

It is an object of the invention to provide a tool cartridge quick change system for endforming machines.

A further object of the invention is to provide a quick change tool cartridge for endforming machines wherein the tool cartridge can be readily manufactured, is concise as not to interfere with the machine operation or components, and of a relatively low cost.

An additional object of the invention is to provide a quick change tool cartridge for endforming machines whereas the tools of an endforming machine may be very quickly and easily replaced or substituted, in many cases even without machine stoppage, and it is an intention of the invention to quickly and accurately locate the tool relative to its support even though quick mounting means are employed.

Yet another object of the invention is to provide a quick change tool cartridge system of an endforming machine wherein tools may be very rapidly mounted upon their support in an accurate and consistent manner, and the tools may be mounted for rotation relative to their support, or mounted for non-rotation, as desired.

SUMMARY OF THE INVENTION

Multiple station endforming machines are used to shape and machine tubular workpieces, such as conduits, manifolds, and the like. Such machines employ a rotatable spindle upon which the workpieces are mounted, and at a multiplicity of work stations about the table, the tools will align and work upon and shape the workpiece as the workpiece rotates on the table. Apparatus of this type is shown in the Assignee's U.S. Pat. No. 6,233,992, and the disclosure of this patent is herein incorporated by reference. The tool cartridge of the invention is readily suitable for use with the machine shown in U.S. Pat. No. 6,233,992.

At each of the endforming machine work stations, a work support such as shown at reference numeral 92 in U.S. Pat. No. 6,233,992 is supported for movement toward and away from the machine table upon which the workpiece is mounted. This stem or work support merely constitutes the support upon which the tool is mounted, and the nature of the tool may be of the type for cutting, shaping, rolling, burnishing, and the like.

The tool support includes a central, cylindrical blind cavity and an annular surface is defined upon the support coaxial with the cavity and radially spaced therefrom. An actuator sleeve is rotatably mounted upon the support outer surface. A plurality of radially extending guide ways, such as holes, are drilled within the tool support intersecting the cavity and the support outer surface, and within each of the guide holes, a locking element in the form of a plunger, rod, ball, or the like is mounted. The inner end of each hole is slightly closed or formed such that the locking element will not pass inwardly entirely from its support hole.

The outer ends of the locking elements are received within recesses formed in the inner surface of the actuator sleeve, and upon alignment of these recesses with the locking elements, the locking elements may be fully retracted from the work support cavity. Each of the recesses defined in the actuator cavity is associated with a cam surface which, upon rotation of the actuator, will engage the end of the associated locking element and force the locking element inwardly such that the inner end of the locking element is thrust into the tool support cavity.

The tool holder, upon which any conventional tool may be mounted, includes a cylindrical shank capable of being closely received with the support cavity. The shank includes either a concentric circular groove whereby it may be quickly mounted within the support cavity in a rotative relationship, or the tool holder may have separate detent holes for receiving the inner end of the locking elements if the tool support and tool holder are to be locked in a non-rotative relationship.

Upon alignment of the tool holder groove or holes with the locking elements, the rotation of the actuator sleeve is permitted so as to cam the locking elements inwardly into the holder. Preferably, a spring force is imposed upon the actuator sleeve to bias the actuator toward the "locked" position to accidently prevent sleeve rotation from inadvertently releasing the tool holder from the support cavity.

Merely by the partial rotation of the actuator sleeve it is possible for the operator to either release the locking elements or to bias the locking elements inwardly to lock the tool holder within the tool support.

BRIEF DESCRIPTION OF THE DRAWINGS

The aforementioned objects and advantages of the invention will be appreciated from the following description and the accompanying drawings wherein.

DESCRIPTION OF THE PREFERRED EMBODIMENT

Figure 1:
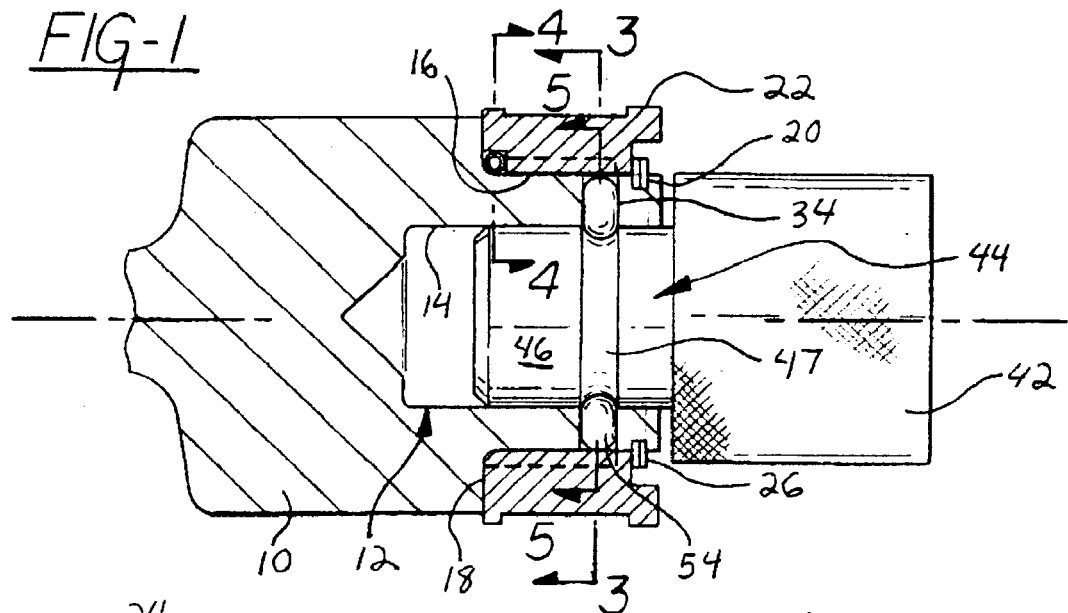
FIG. 1 is an enlarged, detailed, diametrical, sectional view of a quick change tool cartridge system support being shown in section, the tool holder being shown in elevation.

With reference to FIG. 1, the end tool support or stem is shown at 10. This support 10 would be the same as the tool stem 92 in U.S. Pat. No. 6,233,992. The support 10 includes an end in which the socket 12 is formed. The socket 12 constitutes a blind bore having cavity walls 14. Exteriorially, the support 10 is divided with a cylindrical surface 16 coaxial with the socket 12, and as will be appreciated from FIG. 1, the surface 16 is in axial alignment with the socket 12 and defines a radial shoulder 18. Further, an annular groove 20 is defined in the support 10 adjacent the end thereof and in the surface 16 as will be appreciated from FIG. 1.

The actuator sleeve 22 is rotatably mounted upon the support surface 16 and is provided with an exterior surface and shoulders as to be easily manually rotated. The actuator 22 includes a cylindrical inner surface engaging the support surface 16, and a snap ring 26 located within groove 20 axially prevents movement of the actuator sleeve on the support without interfering with its rotation thereon.

Figure 4:
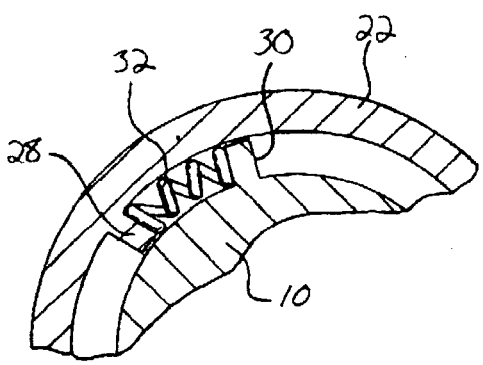
FIG. 4 is a detailed, elevational, sectional view of the support and actuator sleeve illustrating the compression spring biasing the actuator sleeve in a locking position as taken along 4—4 of FIG. 1.

The actuator 22 includes an inwardly extending tang 28, FIG. 4, while the support 12 includes a radially extending tang 30, and the compression spring 32 located between tangs 28 and 30 imposes upon the actuator 22 a rotational force tending to lock the tool holder upon the tool support as later described.

A plurality of radial guides 34 are defined in the support 10 between the socket wall 14 and the actuator support surface 16. The guides 34 are merely holes drilled in the support, but the inner end of the holes where it intersects the socket walls 14 is of a slightly reduced dimension with respect to the remainder of the diameter of the guide holes 34 as to prevent excessive inward movement of the locking elements as later described.

Figure 2:
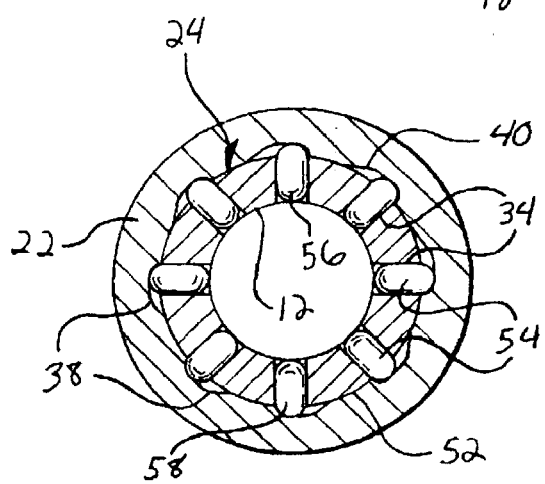
FIG. 2 is a sectional, elevational view taking through the locking elements along Section 3—3 of FIG. 1 when the actuator sleeve is rotated such that its recesses align with the locking elements to permit their retraction from the support cavity.
Figure 3:
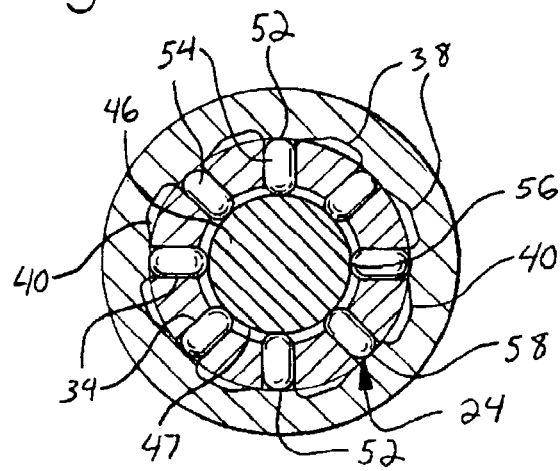
FIG. 3 is an elevational, sectional view similar to FIG. 2 illustrating the actuator sleeve in the locking position inwardly biasing the locking elements for cooperation with the tool support.

Within the actuator inner surface 24, a plurality of cam recesses 38, FIG. 3, are formed, the number of cam recesses equaling the number of guides 34. Each of the cam recesses is intersected by an inclined cam surface 40, FIGS. 2 and 3, which engage the locking elements as is later apparent.

The inner surface 24 also includes cylindrical cam lock surfaces 52 for engaging the outer ends of the locking pins which provides maximum inward displacement of the locking pins.

Figure 5:
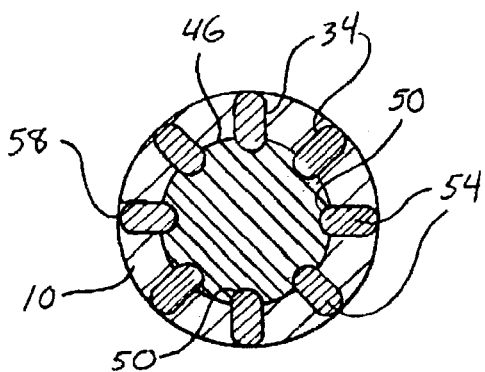
FIG. 5 is a diametrical, elevational section view as taken along Section 5—5 of FIG. 1 illustrating the locking elements in an operational locking condition, the actuator sleeve not being shown for purposes of illustration and illustrating holes within the tool holder shank to lock the tool support and tool holder in a non-rotative relationship.

The endforming machine tool is shown at 42 and is mounted upon a tool holder 44 as generally indicated. The tool holder 44 includes a cylindrical shank 46 which is closely received within the socket 12. The shank 46 includes depression means which may consist of an annular groove as shown in FIG. 1, or may consist of a plurality of holes or recesses 50, FIG. 5, capable of receiving the lock elements.

A locking pin or element 54 is slidably located within each guide hole 34, and each locking pins includes an inner end 56 and an outer end 58. These locking pins ends are convexly rounded for cooperation with the actuator recesses 38, cam surface 40, and cam lock surface 52, and the locking pins inner ends 56 is capable of being received within the tool holder shank depression groove 47 or shank holes 50.

In operation, the actuator sleeve 22 has been rotated to the position shown in FIG. 2 wherein the lock pins 54 are received within the cam recesses 38 and may be retracted their maximum extent from the support socket 12. The tool holder shank 46 may then be quickly and easily inserted into the socket 12 until the shank depression 47 or shank holes 50 are in alignment with the lock pins 54. Thereupon, rotation of the actuator 22 causes the cam surfaces 40 to ride upon the lock pin outer ends 58 forcing the pins 58 inwardly, FIG. 3, wherein the locking pin inner ends 56 will be received within the shank depression groove 47 or the shank holes 50. Continued rotation of the actuator sleeve 22 will align the cylindrical cam lock surfaces 52 with the lock pin outer end 58, FIG. 3, maintaining the lock pins their maximum extension into the shank 46 to hold the tool 42 and holder 44 upon the support or stem 10. When the shank depression consists of a continuous groove 47 as shown in FIG. 1, it is possible to rotate the tool shank 46 relative to the socket 12. However, if the shank 46 is provided with separate holes 50, FIG. 5, the shank 46 and tool 42, and the complete tool holder 44 will not rotate relative to the support 10, as is often required. Thus, the use of either the groove depression 47 or the hole depressions 50 depends on whether or not relative rotation between the support and tool holder is desired.

The invention permits the tool 42 to be quickly mounted upon the support or stem 10 merely by rotating the actuator sleeve 22, and this quick connect system as used upon an endforming machine substantially increases the flexibility of the machine, permits tools to be quickly substituted or replaced, and significantly reduces the machining time.

It is appreciated various modifications to the inventive embodiments may be apparent to those skilled in the art, and it is intended that the scope of the invention be limited only by the recitation of the following claims.

What is claimed is:

1. A quick-change tool apparatus for an endforming machine, comprising:

A tool stem including a socket defined therein, the tool stem having a circumferential outer surface and at least one channel extending radially therethrough between the outer surface and the socket, the at least one channel having freely movably disposed therein a lock pin characterized by a length greater than the length of the at least one channel;

a lock actuator rotatably disposed on the circumferential outer surface of the tool stem, the lock actuator including an inner surface opposing the outer surface of the tool stem, the inner surface having at least one cam recesses defined thereon;

a tool holder having a shank receivable in the socket of the tool stem, the shank including at least one recess dimensioned to receive therein the at least one lock pin;

the quick-change tool apparatus being characterized by an unlocked condition between the tool stem and the tool holder, wherein the lock actuator is rotatably positioned so that the at least one cam recess is aligned with the at least one channel such that the at least one lock pin is movable into the at least one channel and the at least one cam recess, and a locked condition between the tool stem and the tool holder, wherein the lock actuator is rotatably positioned so that the at least one cam recess is out of alignment with the at least one channel and the at least one lock pin is urged into the at least one recess on the shank of the tool holder; and wherein further the lock actuator includes an annular groove having a first stop, the cylindrical portion of the tool stem includes a second stop received within the annular groove, and a spring is positioned in the annular groove between the first and second stops, the spring and the first and second stops cooperating to bias the lock actuator to the locked condition between the tool stem and tool holder.

* * * * *

UNITED STATES PATENT AND TRADEMARK OFFICE
CERTIFICATE OF CORRECTION

PATENT NO.    : 6,932,358 B1
DATED         : August 23, 2005
INVENTOR(S)   : Geisman et al.

It is certified that error appears in the above-identified patent and that said Letters Patent is hereby corrected as shown below:

Column 3,
Line 28, after "sleeve", insert -- 22 --;
Line 29, after "support", insert -- 10 --;
Line 31, delete "12" and insert -- 10 --;
Line 39, after "support", insert -- 10 --;
Line 46, after "recesses", insert -- 38 --.

Signed and Sealed this

Twenty-fourth Day of January, 2006

JON W. DUDAS
*Director of the United States Patent and Trademark Office*